(12) United States Patent
Schuessler et al.

(10) Patent No.: US 12,237,529 B2
(45) Date of Patent: Feb. 25, 2025

(54) BATTERY HOUSING, BATTERY AND MOTOR VEHICLE

(71) Applicant: AUDI AG, Ingolstadt (DE)

(72) Inventors: Martin Schuessler, Koesching (DE); Lars Kruse, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 245 days.

(21) Appl. No.: 16/929,433

(22) Filed: Jul. 15, 2020

(65) Prior Publication Data

US 2021/0028424 A1 Jan. 28, 2021

(30) Foreign Application Priority Data

Jul. 25, 2019 (DE) ............. 10 2019 211 088.6

(51) Int. Cl.
*H01M 50/30* (2021.01)
*H01M 50/24* (2021.01)

(52) U.S. Cl.
CPC ........... *H01M 50/30* (2021.01); *H01M 50/24* (2021.01); *H01M 2220/20* (2013.01)

(58) Field of Classification Search
CPC ...... H01M 50/20; H01M 50/24; H01M 50/30; H01M 2220/20; H01M 50/222; H01M 50/224; H01M 50/227; H01M 50/242; H01M 50/249; H01M 50/3425; H01M 50/358; H01M 50/383; H01M 50/204; H01M 2200/20; Y02E 60/10
See application file for complete search history.

(56) References Cited

U.S. PATENT DOCUMENTS

| | | | |
|---|---|---|---|
| 2005/0170238 A1* | 8/2005 | Abu-Isa | H01M 50/342 429/82 |
| 2012/0263982 A1 | 10/2012 | Yasui et al. | |
| 2015/0194706 A1* | 7/2015 | Tsuji | H01M 50/20 429/104 |

FOREIGN PATENT DOCUMENTS

| | | | |
|---|---|---|---|
| CN | 105489812 A | 4/2016 | |
| CN | 109216628 A | 1/2019 | |
| DE | 10 2013 216 071 A1 | 2/2015 | |
| DE | 10 2015 014 558 A1 | 5/2017 | |
| DE | 10 2016 102 531 A1 | 8/2017 | |
| JP | 2007/027011 * | 2/2007 | ............. Y02E 60/10 |
| JP | 2007-27011 A | 2/2007 | |
| JP | 2010-80352 A | 4/2010 | |
| JP | 2011-204577 A | 10/2011 | |
| JP | 2014/160573 * | 9/2014 | ............. H01M 2/10 |
| JP | 2014-160573 A | 9/2014 | |
| JP | 5772347 B2 | 9/2015 | |

(Continued)

OTHER PUBLICATIONS

English Translation of JP2014/160573.*

(Continued)

*Primary Examiner* — Kiran Quraishi Akhtar

(74) *Attorney, Agent, or Firm* — Maier & Maier, PLLC

(57) ABSTRACT

A battery housing for a battery, in particular for a motor vehicle. The battery housing includes a housing base, a housing cover arranged opposite from the housing base, and multiple side walls, wherein a chamber is enclosed between the side walls, the housing base and the housing cover. At least one side wall of the multiple side walls comprises two side wall elements, which are arranged opposite each other and which form a duct between them.

13 Claims, 3 Drawing Sheets

(56) References Cited

FOREIGN PATENT DOCUMENTS

JP           6056499 B2     1/2017

OTHER PUBLICATIONS

English Translation of JP2007/027011.*
Examination Report issued on May 4, 2020 in corresponding German application No. 10 2019 211 088.6; 18 pages including Machine-generated English-language translation.
Office Action issued on Jun. 29, 2022 in corresponding Chinese Application No. 202010720520.5, 13 pages (including English translation).
Office Action issued on Jul. 13, 2023, in corresponding Chinese Application No. 202010720520.5, 8 pages.

* cited by examiner

BATTERY HOUSING, BATTERY AND MOTOR VEHICLE

FIELD

The disclosure relates to a battery housing for a battery, in particular for a motor vehicle. The battery housing includes a housing base, a housing cover arranged opposite the housing base and multiple side walls. Furthermore, a chamber is enclosed between the housing base, the housing cover and the side walls. The disclosure also includes a battery with the battery housing according to the disclosure and a motor vehicle with a battery.

BACKGROUND

In current battery systems, cell degassing occurs in the case of an event, such as damage to the battery system caused by an accident. In this case, the gas freely escapes from the cell into the battery housing. Although a main flow direction of the gas during the degassing can be defined by means of an emergency opening or a burst diaphragm, all escaping portions of the gas flow can freely spread out in the battery system. This can lead to further damage due to the high temperatures of the escaping gas and the high chemical reactance.

It is necessary to reserve a portion of the installation space in the corresponding dimensional chain of the battery system for degassing the cells, in order to ensure an outflow of the gases. Additional fire protection measures are also necessary. This leads to a reduction in the energy density of the overall system. In addition, depending on the direction of the escaping gas, other components, such as battery cells, and/or the passenger compartment can be affected by escaping gases. This could lead to an ignition of the passenger compartment or a danger to the occupants.

Different approaches to directing a fluid flow through a battery are known from the general state of the art.

For example, DE 10 2016 102 531 A1 describes a motor vehicle battery that comprises a liquid-cooled battery base for heat dissipation, a battery frame connected to the battery base and at least one battery module. The battery frame is designed to be gas permeable for cooling the battery module with a gas.

JP 577 2347 B2 discloses a battery mounting structure of a battery of a motor vehicle. The battery mounting structure comprises a pair of right and left side frames attached to a battery module. The side frame pairs are open at both ends. An air flow passes through the side frame pairs during the operation of the motor vehicle.

JP 6056499 B2 describes a battery housing. The battery housing comprises a housing body that is set up to accommodate a battery module, and a cover that covers and closes an opening of the housing body. The housing body has a gas flow opening and a gas exhaust opening, via which a gas can flow through the housing body from the gas flow opening to the gas exhaust opening.

A disadvantage of such fluid guidance systems is that these require additional installation space and are particularly complex.

The problem underlying the present disclosure therefore is to provide a battery housing as well as a battery with a battery housing, which is, or which are, designed particularly simply and space-saving and at the same time ensure(s) a discharge of gases leaking from the battery cells in a particularly reliable and safe manner.

SUMMARY

This problem is solved by a battery housing, by a battery with a battery housing, and by a motor vehicle with a battery. Advantageous embodiments with useful and non-trivial further developments of the disclosure are described below.

According to the disclosure, this problem is solved by a battery housing for a battery or a battery module, in particular for a motor vehicle. The battery housing comprises a housing base, a housing cover arranged opposite from the housing base, and multiple side walls, wherein a chamber is enclosed between the side walls, the housing base and the housing cover. The housing cover and the housing base are preferably arranged opposite one another at a predetermined distance, in particular parallel to one another. Preferably, the battery housing comprises four side walls, which are arranged in pairs opposite to each other between the housing base and the housing cover. In particular, the side walls arranged in pairs preferably extend parallel to each other. Therein, the housing cover rests on the side walls. The side walls, together with the housing cover, are arranged on the housing base. It is preferred that one side wall—in particular, per sidewall pair—is arranged at one end of the housing cover or housing base, and the other side wall at an opposite end of the housing cover or the housing base. A chamber is enclosed between the housing base, the housing cover and the side walls. In other words, a cavity or a chamber may be formed between the housing base, the housing cover and the side walls. Preferably, the chamber is designed to accommodate one or multiple battery cells of a battery of the motor vehicle.

The disclosure is characterized in that at least one side wall of the multiple side walls comprises two side wall elements, which are arranged opposite to each other, in particular parallel to each other, and form a duct between each other. In other words, at least one side wall of the side walls can be designed as a hollow profile or as a profile with a hollow interior, wherein the hollow profile is formed by two side wall elements that are arranged at a predetermined distance from each other and thereby form a duct or a cavity between each other. Preferably, the duct can be designed as a degassing duct. In particular, the side wall may be designed as a structural profile for guiding the gas flow. In particular, the two sidewall elements extend, preferably parallel to each other, in a lateral direction or a longitudinal direction of the battery housing between the housing base and the housing cover.

Designing at least one side wall as a degassing duct has the advantage that the degassing duct is integrated into the housing, thus reducing or even preventing an escape or leak of gases during a cell degassing. This can increase the safety of a battery, especially when the battery is in operation. Furthermore, by designing at least one side wall as a degassing duct, the battery housing is of a particularly simple design.

An advantageous embodiment provides that the side wall element facing the chamber has a reduced wall thickness at a predetermined area compared with the rest of the side wall element. In other words, the sidewall element facing the chamber may have different, in particular two different, sections with regard to wall thickness, or be divided into at least two sections with different wall thicknesses. In other words, the sidewall element facing the chamber may have a reduction in the wall thickness, in particular in a specific area. Preferably, the predetermined area, which has a reduced wall thickness, has a smaller expansion than the rest of the sidewall element. Due to the reduced wall thickness, no opening has to be introduced in the battery housing, which makes the battery housing particularly secure.

Particularly preferably, the side wall element can be opened or removed at the predetermined area at a predetermined pressure and/or a predetermined temperature by a fluid, such as a gas, acting on the predetermined area. In other words, the sidewall element is breakable at the predetermined area at a predetermined pressure and/or a predetermined temperature by a fluid acting on the predetermined area, such that the sidewall element then has an opening in the area of the predetermined area. In other words, the weak point in the duct intended for the gas flow, specifically in the sidewall element, can be opened by the influence of heat and/or pressure. For example, the predetermined area can melt as a result of the fluid acting on the predetermined area. For this purpose, it is advantageous if the at least one side wall or the sidewall element facing the chamber is formed at least partially, i.e., is completely or partially formed, of aluminum or a polymer. By designing the side wall or the side wall element from aluminum or a polymer, it can be ensured that the predetermined area can be opened by the escaping fluid or gas, thereby increasing safety during the operation of the battery.

According to an alternative advantageous embodiment, it is provided that the side wall element facing the chamber has an opening at a predetermined area, which is closed by a cover element, wherein the cover element can be detached from the opening at a predetermined pressure and/or a predetermined temperature of a fluid acting on the cover element. For example, the opening in the duct, in particular the opening in the side wall element facing the chamber, can be closed by a plug as a cover element. The plug is designed such that it can be detached or opened by external influences of pressure and/or temperature. The cover element is preferably pressed into the opening. The cover element can be used to ensure that the opening can be cleared by the escaping fluid or gas, thereby increasing safety in the operation of the battery.

The at least one side wall advantageously has a protective wall which is arranged between the at least two side wall elements, wherein the protective wall extends in the direction of the side wall elements and divides the duct into two duct sections. The protective wall is preferably formed from a fire protection material, in particular from mica. The term "mica" in particular refers to a group of minerals of the category of layered silicates with the same atomic structure. The protective wall can particularly preferably be designed as a mica disc. Alternatively, other comparable fire protection materials or insulating materials can be used for the protective wall. The additional protective wall results in the advantage that the battery housing is particularly safe and reliable.

According to an advantageous development, it is provided that the battery housing furthermore has at least one valve, wherein the at least one valve is arranged on the at least one side wall, in particular at one end of the duct. The battery housing particularly preferably has two valves, wherein one valve is arranged at one end of the duct and the other valve at the opposite end of the duct. The valve preferably couples the duct fluid-tight to an environment of the battery housing. In particular, a fluid located in the duct can be released to the environment of the battery housing via the valve. Preferably, the valve can be formed as a degassing valve. In particular, the gas directed through the duct can be transferred to the outside via the degassing valves at the beginning and at the end of the battery housing. The valve results in the advantage that the battery housing is particularly safe and reliable.

The disclosure also includes a battery with the battery housing according to the disclosure An advantageous embodiment provides that the battery has multiple battery modules, wherein a battery module comprises multiple battery cells, which are arranged in the chamber, wherein the battery cells each have a degassing opening, wherein the degassing opening is arranged on a side of the battery cell facing the at least one side wall. The term "degassing opening" in particular refers to an opening in the battery cell through which a gas can escape or flow from the battery cell to an environment of the battery cell. Due to the corresponding arrangement of the degassing opening, a degassing direction of the battery cell is adapted such that a flow of the gas escaping from the cell is directed at the duct and can flow into the same.

Finally, the disclosure also includes a motor vehicle with the battery according to the invention. The motor vehicle according to the disclosure is preferably designed as an automobile, in particular as a passenger car or truck, or as a passenger bus or motorcycle. The motor vehicle is particularly preferably designed as an electric vehicle.

The disclosure also includes further developments of the battery according to the disclosure and of the motor vehicle, which has characteristics as already described in the context of the further developments of the battery housing according to the invention. For this reason, the corresponding developments of the battery according to the invention and the motor vehicle according to the invention are not described here again.

The disclosure also includes the combinations of the characteristics of the embodiments described.

BRIEF DESCRIPTION OF THE DRAWINGS

Exemplary embodiments of the invention are described hereafter. The drawings show.

DETAILED DESCRIPTION

Figure 1:
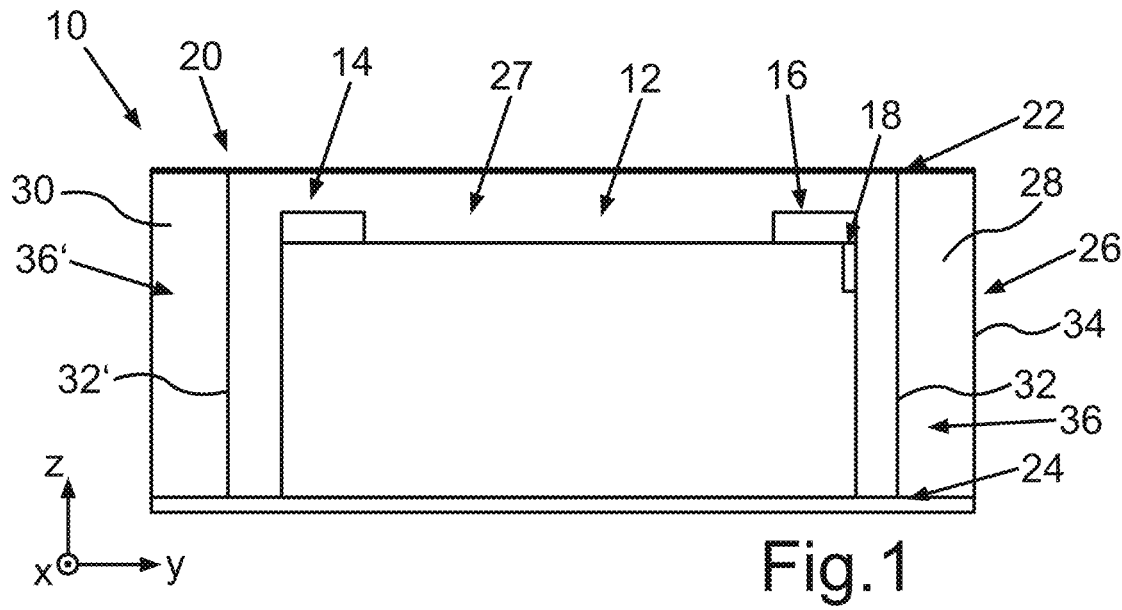
FIG. 1 A schematic representation of a battery module with a battery housing comprising a housing cover, a housing base and side walls, and a battery cell arranged in a chamber of the battery housing with a degassing opening in a sectional representation FIG. 2 A schematic representation of the battery module of FIG. 1 in a sectional representation, wherein, in accordance with one embodiment, a side wall element of a side wall has a weak point at a predetermined area FIG. 3 A schematic representation of the battery module of FIG. 1 in a sectional representation, wherein, in accordance with one embodiment, a side wall element of a side wall has an opening in a predetermined area, which opening is closed by a cover element FIG. 4 A schematic representation of the battery module of FIG. 1 in a sectional representation, wherein, in accordance with one embodiment, the battery housing has a protective wall which is arranged in a side wall FIG. 5 A schematic view of a battery of a motor vehicle with multiple battery modules in a sectional view, wherein a battery module comprises multiple battery cells FIG. 6 A schematic illustration of a motor vehicle with a battery in a side view

The exemplary embodiments explained hereafter are preferred embodiments of the invention. In the exemplary embodiments, the described components of the embodiments each represent individual characteristics of the invention to be considered individually, which characteristics each further develop the invention independently of each other. Therefore, the disclosure is intended to also comprise combinations of characteristics of the embodiments other than those shown. Furthermore, the described embodiments can also be complemented by further characteristics of the invention already described.

Identical reference numbers in the drawings designate elements that have the same function.

FIG. 1 shows a battery module 10 of a battery. The battery, which can be designed in particular as a traction battery, can be a component of a motor vehicle, for example. The motor vehicle is preferably designed as an electric vehicle.

The battery module 10 comprises at least one battery cell 12. The battery module 10 preferably comprises multiple battery cells. The term "battery cell" in particular refers to an electrical energy storage device, preferably an electrically rechargeable energy storage device. Only one battery cell 12 is shown in FIGS. 1 to 4. The battery cell 12 comprises two terminals, a positive terminal 14 and a negative terminal 16. The battery cell 12 has a square shape. The battery cell 12 also has a degassing opening 18. Gas is discharged from the battery cell 12 via the degassing opening 18, which can also be referred to as a degassing valve.

Furthermore, the battery module 10 or the battery has a battery housing 20. The battery housing 20 comprises a housing cover 22, a housing base 24 and side walls 26. The battery cell 12 is arranged on or at the housing base 24 or rests on the housing base 24. Preferably, the housing cover 22 is arranged at a predetermined distance to, in particular parallel to, the housing base 24. The side walls 26 are arranged between the housing base 24 and the housing cover 22. Together, the housing base 24, the housing cover 22 and the side walls 26 enclose a chamber 27. In other words, a cavity may be formed or enclosed between the housing base 24, the housing cover 22 and the side walls 26. The battery cell 12 is arranged or accommodated in the chamber 27. FIGS. 1 to 4 show two side walls of the side walls 26 of the battery module 10. The battery module 10 or the battery preferably has four side walls 26, wherein two respective side walls are arranged in pairs opposite to each other at a predetermined distance from one another. In particular, the side walls include the battery cell 12 or the battery cells of the battery module 10.

In FIG. 1, a first sidewall 28 at an end or end portion of the housing cover 22 and/or the housing bottom 24, and a second sidewall 30 at an opposite end or end portion of the housing cover 22 and/or the housing bottom 24 are arranged at a predetermined distance to each other, in particular at a distance in a width direction y. The first side wall 28 and the second side wall 30 can be arranged parallel to each other. The first side wall 28 and the second side wall 30 extend in a main direction of expansion x or in a longitudinal direction of the battery housing 20. The first side wall 28 and the second side wall 30 can be designed identically to each other. Therein, the first side wall 28 has two side wall elements—a first sidewall element 32 and a second sidewall element 34. The two side wall elements 32, 34 are arranged opposite each other, in particular at a predetermined distance to each other, preferably parallel to each other. The two side wall elements 32, 34 enclose a duct 36 between them. Therein, the first sidewall element 32 faces the chamber 27.

The second sidewall 30 is designed analogously or identically to the first sidewall 28. Correspondingly, the second side wall 30 also has two side wall elements—a first sidewall element 32' and a second sidewall element 34'. The two side wall elements 32', 34' of the second side wall 30 are arranged opposite each other, in particular at a predetermined distance to each other, preferably parallel to each other. The two side wall elements 32', 34' of the second side wall 30 enclose another duct 36' between them. The first side wall element 32' of the second side wall 30 faces the chamber 27. The housing cover 22, the housing base 24, the first sidewall element 32 of the first sidewall 28 and/or the second sidewall element 34 of the first sidewall 28 and/or the first sidewall element 32' of the second sidewall 30 and/or the second sidewall element 34' of the second sidewall 30 are preferably panel-shaped or designed as a panel. The first side wall 28 and/or the second side wall 30 may be designed as a profile, in particular as a hollow profile or a structure.

As shown in FIG. 1, the degassing opening 18 of the battery cell 12 is arranged on the side of the battery cell 12 facing the first sidewall element 32 of the first side wall 28. In other words, the degassing opening 18 is arranged opposite the first side wall element 32 of the first side wall 28.

The other or additional side walls of the battery module 10 or of the battery housing 20 can preferably also be designed analogously to the first side wall 28 with the first side wall element 32 and the second side wall element 34, and the duct 36 arranged between them. The duct 36, 36' arranged in the side walls 28, 30 can be designed as a degassing duct.

Figure 2:
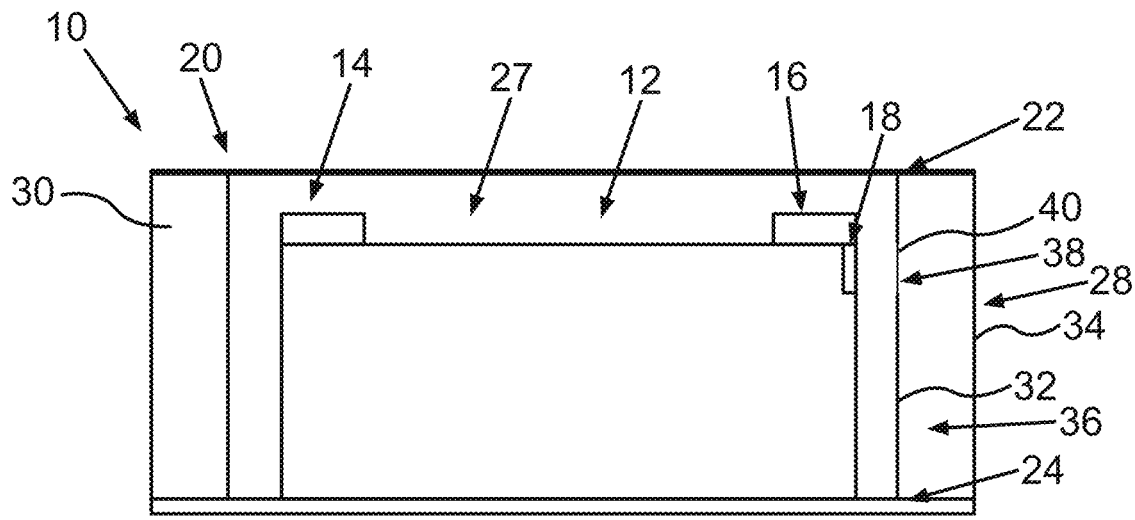
Figure 3:
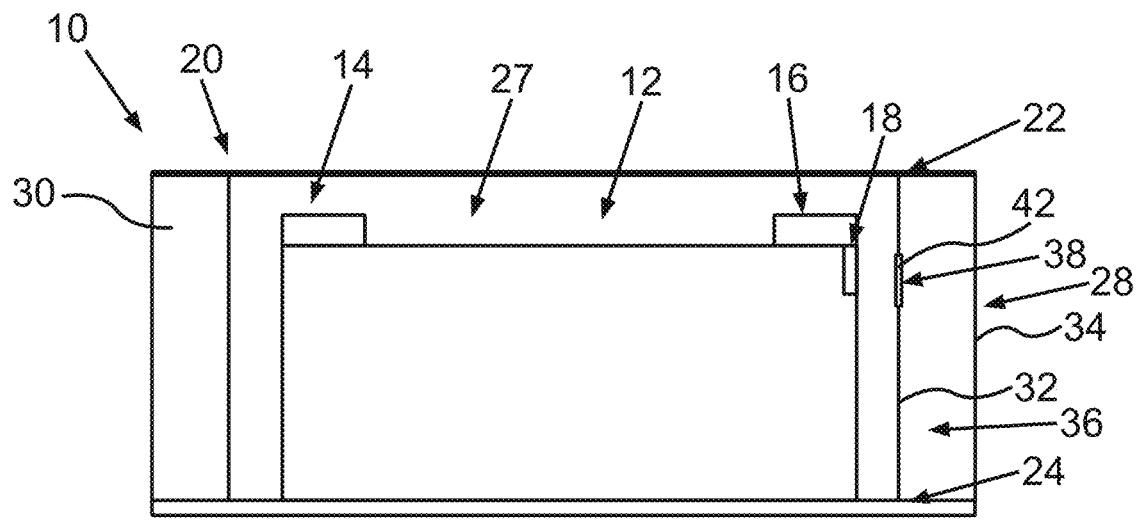

The gas escaping from the degassing opening 18 or the escaping gas flow is directed toward at least one side wall 28, 30. Due to the arrangement of the degassing opening 18, as shown in FIGS. 1 to 4, the gas flow escaping from the battery cell 12 is directed toward the first sidewall element 32 of the first sidewall 28. In order for the gas escaping from the battery cell 12 to reach the duct 36 of the first side wall 28, different embodiments of one of the side walls are shown in FIGS. 2 and 3. In FIGS. 2 and 3, the first sidewall 28 has different embodiments.

For the gas escaping from the degassing opening 18 to enter the duct 36 of the first side wall 28, the first sidewall element 32 has a weak point 40 at a predetermined area 38, as shown in FIG. 2. The weak point 40 is formed as a result of the first side wall element 32 having a reduced wall thickness at the predetermined area 38 compared to the rest of the side wall element 32. The predetermined area 38 preferably has a smaller expansion or takes up a smaller area of the side wall element than the rest of the side wall element. The predetermined area 38 is preferably arranged at the height of the degassing opening 18 of the battery cell 12. In other words, the degassing opening 18 and the predetermined area 38 can be arranged opposite each other, in particular at the same height.

The first side wall element 32 can be removed, in particular can be broken, at the predetermined area 38 at a predetermined pressure and/or a predetermined temperature by the gas acting on the predetermined area 38. In other words, the sidewall element 32 is breakable at the predetermined area 38 at a predetermined pressure and/or a predetermined temperature by the gas acting on the predetermined area 38, such that the first sidewall element 32 then has an opening in the area of the predetermined area 38. For example, the first sidewall element 32 can be melted or opened at a predetermined pressure and/or a predetermined temperature of the gas at the predetermined area 38. In other words, the weak point 40 can be opened by the influence of heat and/or pressure in the duct intended for the gas flow.

To allow the predetermined area 38 of the first sidewall element 32 to be opened under a predetermined pressure and/or a predetermined temperature of the gas, the first sidewall element 32 or the predetermined area of the first sidewall element 32 is formed from aluminum or a polymer.

FIG. 3 shows an alternative embodiment of the first sidewall element 32. Instead of the first sidewall element 32 having a weak point in a predetermined area 38, the first sidewall element 32 in FIG. 3 has an opening, which is closed or covered by a cover element 42. In a closed state of the opening, i.e., if the cover element 42 closes the predetermined area 38, i.e., the opening, the cover element 42 is pressed into the first sidewall element 32. At a predetermined pressure and/or a predetermined temperature of a gas exiting from the degassing opening 18 and acting on the cover element 42, the cover element 42 is detachable from the opening. The cover element 42 is designed as a plug, for example. The opening 38 is preferably arranged at the height of the degassing opening 18 of the battery cell 12. In other words, the degassing opening 18 and the opening 38 can be arranged opposite each other, in particular at the same height.

Figure 4:
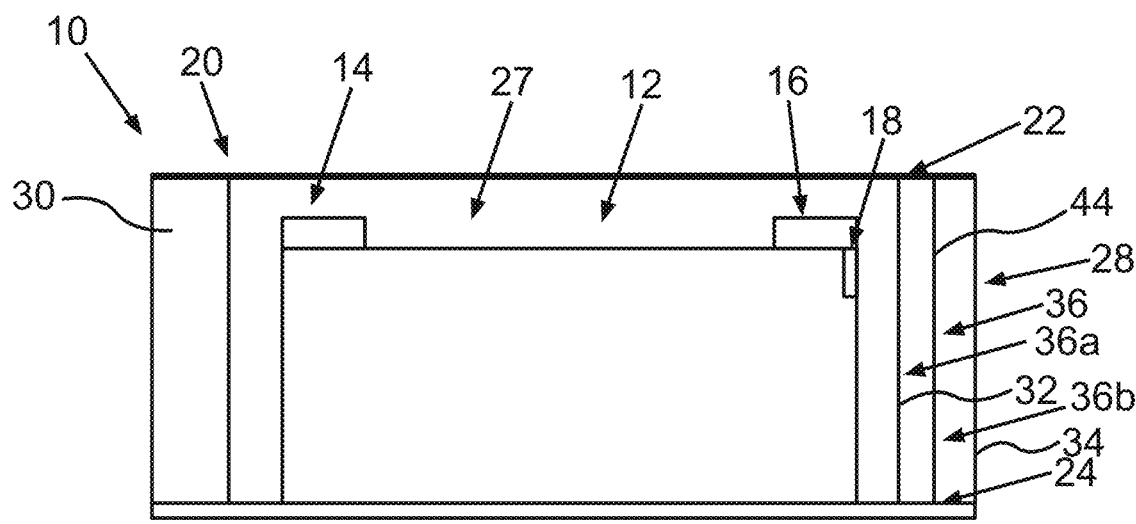

FIG. 4 shows a further embodiment of the first side wall 28. Therein, the first sidewall element 32 can be designed as shown in FIG. 2 or FIG. 3. Therein, the first side wall 28 has a protective wall 44. The protective wall 44 is arranged between the two side wall elements 32, 34 and extends in the direction of the side wall elements 32, 34. The protective wall 44 divides the duct 36 of the first side wall 28 into two duct sections: a first duct section 36a and a second duct section 36b. The protective wall is preferably panel-shaped. The protective wall 44 is formed from a fire protection material, in particular from mica. In particular, the protective wall 44 can be designed as a mica wall.

Figure 5:
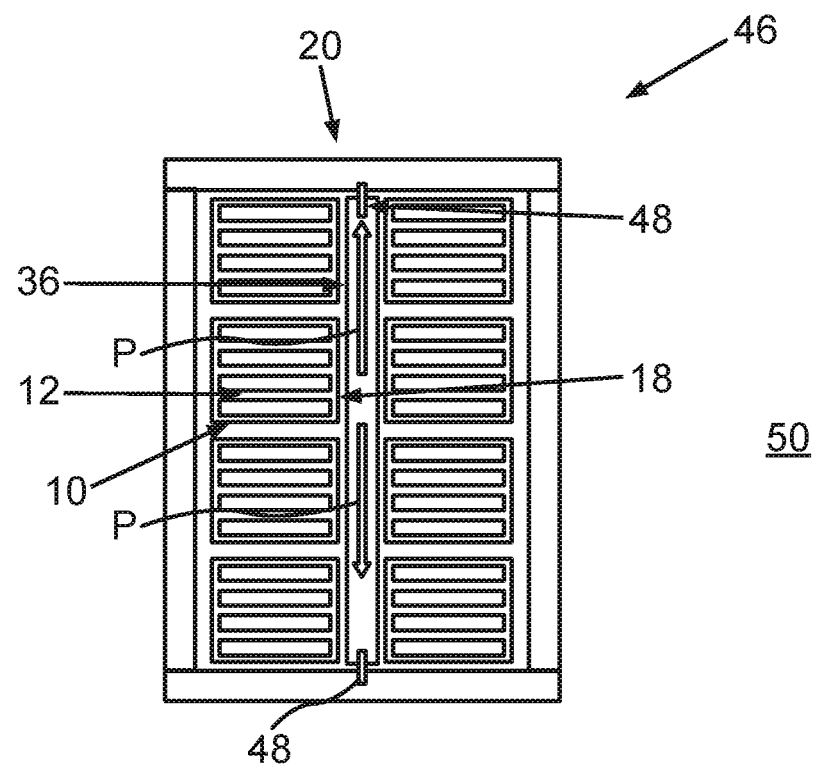

FIG. 5 shows a battery 46 with multiple battery modules 10. In total, the battery 46 has eight battery modules 10. Each battery module 10 has four battery cells 12. The battery has two rows of battery modules 10. Therein, the rows are separated from each other by a side wall, which in particular is designed as a partition. The battery modules 10 are delimited or enclosed by four further side walls, which are arranged in particular orthogonally to each other. The respective side walls are designed as described in FIGS. 1 to 4. In particular, the partition is designed like the first side wall, as described in FIG. 3 or FIG. 4. Therein, the first side wall element faces the battery modules 10 and/or battery cells 12. The respective battery modules 10 and/or battery cells 12 have a degassing opening. The respective degassing opening of the battery cells 12 and/or the battery modules 10 faces the partition. The gas escaping from the battery module 10 and/or the battery cells 12 passes through the degassing opening into the duct 36 of the side wall or partition, in particular via the predetermined area as described in FIG. 3 or FIG. 4 According to the exemplary embodiment of FIG. 5, the escaping gas enters the side wall designed as a partition, in particular duct 36. As illustrated by arrows P, the escaping gas is transferred into the duct 36 via the degassing opening 18. A valve 48, which in particular is designed as a degassing valve, is arranged at the respective ends of the duct 36.

The valve 48 couples the duct 36 fluid-tight with an environment 50 of the battery housing 20 or with further ducts of the other side walls. In particular, a fluid located in the duct 36 can be released to the environment 50 of the battery housing 20 via the valve 48.

Figure 6:
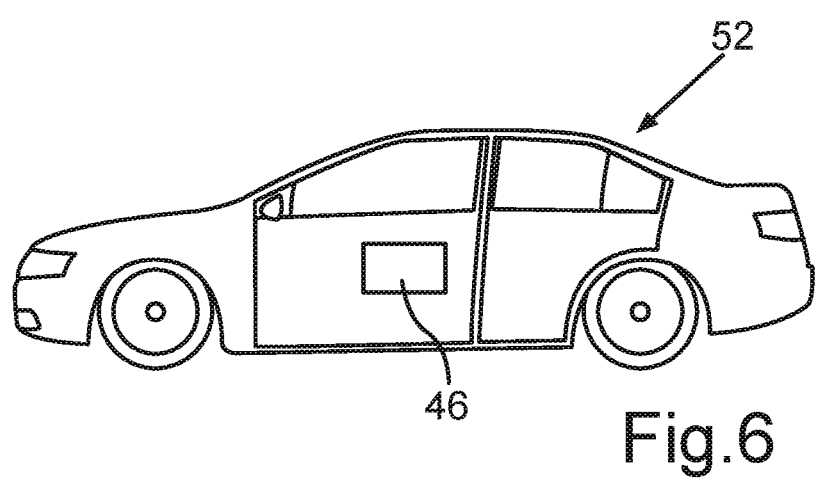

FIG. 6 shows a motor vehicle 52 with a battery 46. The battery 46 may be arranged in the area of an underbody of the motor vehicle 52. The motor vehicle 52 is particularly preferably designed as an electric vehicle.

Overall, the examples show how the disclosure can provide a battery housing with integrated degassing duct in the structural component.

In order to be able to ensure that the gases escaping from the cell can flow into the cavities of the structural spaces, appropriate possibilities must be created.

Primarily, the outgassing direction of the cell can be adjusted to point in the direction of the ducts provided for the gas flow. It is also possible to ensure that the gas of the cell can enter the duct. For this purpose, an inlet opening can be provided in the profile, which is opened by the temperature and/or pressure of the escaping gases. In addition, it must be prevented that the gas flows back through other openings.

According to an embodiment, a local reduction of the wall thickness is provided in the duct provided for the gas flow, which forms a weak point, which is opened by the influence of heat and/or pressure. This is especially conceivable for gas-bearing profile materials with lower temperature resistance, such as aluminum and/or polymers.

Alternatively, a local opening can be provided in the gas-bearing duct, which is closed by means of a plug. This plug must be designed in such a way that it only detaches or opens due to the external influence of pressure and/or temperature.

The gas directed through the ducts can then be transferred to the outside via the degassing valves at the beginning and end of the battery system. In order to prevent the gases from escaping on the opposite side of the duct, a protective wall from a fire protection material, such as mica, can optionally be inserted.

The invention claimed is:

1. A battery housing for a battery for a motor vehicle, comprising:
   a housing base;
   a housing cover arranged opposite the housing base; and multiple side walls, wherein a chamber is enclosed between the multiple side walls, the housing base, and the housing cover, at least one side wall of the multiple side walls comprises a first side wall element and a second side wall element which are arranged opposite each other and form a duct between them, the first side wall element faces the chamber, a protective wall is arranged between the first side wall element and the second side wall element, the chamber has at least one degassing opening arranged facing the first side wall element, the first side wall element has an opening at a predetermined area compared with the second side wall element; and
   a cover element comprises a plug that is pressed into the first side wall element at the opening and configured to be detached from the opening by a fluid acting on the cover element, the at least one degassing opening and the opening of the first side wall element are at a same height relative to the housing base, and the plug is configured to only detach from the opening at a predetermined temperature of the fluid acting on the predetermined area.

2. The battery housing according to claim 1, wherein the first side wall element is at least partially formed from aluminum or a polymer.

3. The battery housing according to claim 1, wherein the protective wall divides the duct into two duct sections.

4. The battery housing according to claim 3, wherein the protective wall is formed from mica.

5. The battery housing according to claim 1, further comprising: at least one valve at one end of the duct.

6. A battery with a battery housing comprising:
a housing base;
a housing cover arranged opposite the housing base; and
multiple side walls, wherein a chamber is enclosed between the multiple side walls, the housing base, and the housing cover, at least one side wall of the multiple side walls comprises a first side wall element and a second side wall element which are arranged opposite each other and form a duct between them, the first side wall element faces the chamber, a protective wall is arranged between the first side wall element and the second side wall element, the chamber has at least one degassing opening arranged facing the first side wall element, the first side wall element has an opening at a predetermined area compared with the second side wall element; and
a cover element comprises a plug that is pressed into the first side wall element at the opening and configured to be detached from the opening which is removable by a fluid acting on the cover element, the at least one degassing opening and the opening of the first side wall element are at a same height relative to the housing base, and the plug is configured to only detach from the opening at a predetermined temperature of the fluid acting on the predetermined area.

7. The battery according to claim 6, wherein the battery has multiple battery modules, each battery module has multiple battery cells arranged in the chamber, and the degassing opening of each battery cell is arranged on a side of the respective battery cell that faces the first side wall element.

8. The battery housing according to claim 1, wherein the protective wall extends in the direction of the side wall elements and divides the duct into two duct sections.

9. The battery housing according to claim 2, wherein the protective wall extends in the direction of the side wall elements and divides the duct into two duct sections.

10. The battery housing according to claim 1, further comprising: at least one valve, wherein the at least one valve is arranged at one end of the duct.

11. The battery housing according to claim 2, further comprising: at least one valve, wherein the at least one valve is arranged at one end of the duct.

12. The battery housing according to claim 3, further comprising: at least one valve, wherein the at least one valve is arranged at one end of the duct.

13. The battery housing according to claim 4, further comprising: at least one valve, wherein the at least one valve is arranged at one end of the duct.

* * * * *